Feb. 11, 1958     H. L. BARTELT     2,822,934
DISPENSING DEVICE
Filed May 28, 1954
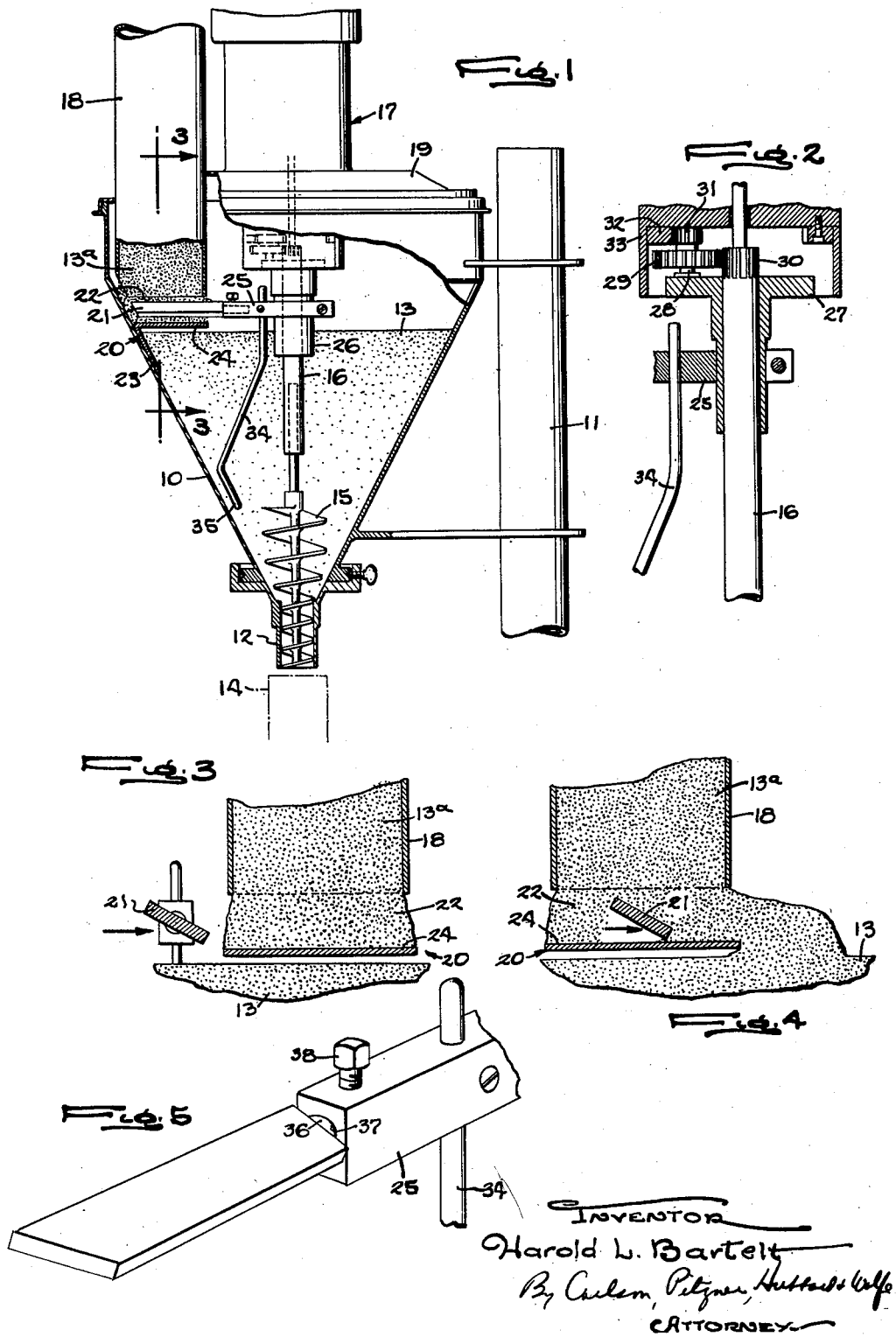
INVENTOR
Harold L. Bartelt
ATTORNEY

United States Patent Office 2,822,934
Patented Feb. 11, 1958

2,822,934

DISPENSING DEVICE

Harold L. Bartelt, Rockford, Ill., assignor of forty-five percent to Donald E. Bartelt, Rockford, Ill.

Application May 28, 1954, Serial No. 432,973

7 Claims. (Cl. 214—17)

This invention relates to a device for dispensing material from a supply receptacle into a container in which the material is to be packaged and, more particularly, to a device in which the material delivered to the receptacle or hopper is dispensed in measured quantities by a dispensing mechanism such as an auger. In such a device, the accuracy with which the auger operates is dependent in part upon maintaining a constant head of material above the auger.

The general object of the invention is to provide a new and improved dispensing device of the above character in which the head of material above the dispensing mechanism is maintained uniformly so that the material is dispensed in accurately measured quantities.

A more detailed object is to provide a novel arrangement by which the material is delivered to the interior of the hopper at the same rate at which it is dispensed and this regardless of the nature and consistency of the material.

Other objects and advantages of the invention will become apparent from the following detailed description taken in connection with the accompanying drawings, in which Figure 1 is a vertical sectional view of a dispensing device embodying the novel features of the present invention.

Fig. 2 is an enlarged fragmentary sectional view of a portion of the device.

Fig. 3 is an enlarged fragmentary sectional view taken along the line 3—3 in Fig. 1.

Fig. 4 is a view similar to Fig. 3 but showing the parts in a different position.

Fig. 5 is a fragmentary perspective view of the means for delivering the material to the interior of the supply receptacle.

For purposes of illustration, the invention is shown in the drawings as embodied in a dispensing device comprising an inverted cone-shaped hopper 10 stationarily mounted on an upright post 11 and formed at its lower end with a centrally disposed outlet or spout 12 through which the material 13 within the hopper is dispensed and deposited in a container 14. Herein, the material is dispensed by means of an auger or feed screw 15 disposed along the axis of the hopper and extending from a point within the body 13 of material and into the spout. The auger is turned intermittently through predetermined angles to dispense measured quantities of the material and, for this purpose, it is secured to a shaft 16 extending along the axis of the hopper and driven by a motor (not shown) through a suitable indexing mechanism 17. The latter may be of any type well known in the art and preferably is similar to that disclosed in my copending application Serial No. 354,211, filed May 11, 1953.

To replenish the body 13 of material in the hopper 10, material 13ª is delivered to the hopper through an inlet 18. In the present instance, the inlet is in the form of a vertical tube projecting down through the cover 19 of the hopper and disposed at one side of the hopper axis.

The accuracy with which the auger 15 dispenses the measured quantities of material depends upon maintaining a constant head of material in the hopper 10 above the auger. In dispensing certain materials and particularly those with a high fat content such as pie crust mixes, difficulty has been encountered in maintaining a uniform head. Instead of flowing steadily into the hopper, the material tends to stand in the inlet tube 18 and then suddenly rush into the hopper with the result that the head changes instantly from a relatively low to a high value. Furthermore, the material at the sides of the hopper often remains in place and only the material in the center is dispensed so that the head of material actually above the auger is quite small. As a result of the changing head, the auger dispenses quantities of material which are not uniform.

To overcome the foregoing difficulties and dispense accurately measured quantities, the present invention contemplates the provision of a novel means for delivering material from the inlet 18 to the body 13 at substantially the same rate as the material is dispensed by the auger 15 so as to maintain a constant head of material above the auger. Preferably, this means also acts to spread the material uniformly and thus prevent the build-up of material along the sides of the hopper 10. This means comprises a support 20 disposed beneath and spaced below the inlet to support the material delivered therethrough and a member 21 which periodically is moved through the space 22 between the support and the inlet to transfer a quantity of material from the support 20 to the body 13 of material and thereby replace the material dispensed by the auger.

In the present instance, the support 20 is in the form of an angle bracket with a downwardly projecting leg 23 secured to the side wall of the hopper 10 and with the other leg 24 horizontally disposed below the lower end of the tube 18 to cooperate with the latter to define the space 22 through which the member 21 moves. The member may, as illustrated in the drawings, be an elongated horizontal paddle radiating from the axis of the hopper and mounted to turn about this axis.

The paddle 21 is secured to a radial arm 25 which is clamped to a sleeve 26 encircling and rotatable relative to the drive shaft 16 for the auger 15. Journaled on and upstanding from a radial flange 27 on the upper end of the sleeve is a stub shaft 28 to which is fastened a spur gear 29 meshing with spur teeth 30 formed on the auger shaft 16. A second gear 31 fast on the stub shaft meshes with an internal ring gear 32 bolted to the underside of a stationary casing 33 which depends from the housing of the indexing mechanism 17. Thus, as the auger shaft 16 is turned, the gears 29 and 30 cause the stub shaft 28 to rotate. As a result, the gear 31 moves around the ring gear 32 causing the sleeve 26 and hence the paddle 21 to turn about the hopper axis. The gears effect a speed reduction so that the paddle turns more slowly than the auger, the ratio in this instance being on the order of 1 to 7.

With the foregoing arrangement, the material 13ª in the inlet tube 18 normally is supported in a column by the shell 20 as shown in Fig. 3. Due to the nature and consistency of the material, the latter does not tend to flow from the shelf to the interior of the hopper 10. As the paddle 21 moves through the space 22 between the shelf and the tube, it pushes ahead of it a portion of the material on the shelf (see Fig. 4) and transfers this material to the body 13 of material within the hopper. The paddle is so arranged that the material is transferred from the shelf at the same rate as it is dispensed by the auger. Thus, in the present instance, the paddle transfers in each revolution approximately seven times as much material as is dispensed by each complete turn of the auger, this compensating for the speed reduction between the auger and the paddle. As a result of equalizing the inflow and outflow of material, the amount of material in the hopper remains substantially constant and the head of material above the auger is uniform throughout the operation of the dispenser. Because of this, the auger accurately dispenses the measured quantities of material.

In addition to transferring the material from the shelf 20 to the body 13, the paddle 21 also spreads the material evenly on top of the body as it sweeps across the latter. The spreading of the material may be aided by a low speed agitator 34 which is immersed in and turns through the body of material in the hopper. Herein, the agitator is in the form of a rod bolted to and depending from the arm 25 to turn with the paddle. The lower end portion 35 of the agitator is disposed close to and is bent to parallel the hopper wall and thus prevents the material from sticking to the sides of the hopper. In this way, the material is distributed evenly across the hopper and this increases the uniformity of the head of material above the auger.

It will be observed that the amount of the material removed from the shelf 20 by the paddle 21 depends upon the effective vertical area of the paddle. In order that the material removed from the shelf closely approximates the material dispensed by the auger, means is provided to adjust this effective area of the paddle. Herein, this means comprises a connection between the paddle and the arm which permits angular adjustment of the paddle so that the latter may be held in the vertical plane or at any angle thereto. As illustrated in Figs. 1 and 3, the connection between the paddle and the arm may be formed by a reduced inner end portion 36 of the paddle which is cylindrical and is received in a mating hole 37 in the end of the arm. Thus, the paddle is adjusted by turning it about its longitudinal axis and is clamped in the adjusted position by a set screw 38 threaded into the arm 25 and bearing against the end portion 36 of the paddle. By virtue of this adjustment, the paddle may be used with a variety of augers and still transfer the material from the shelf 20 at the rate at which the material is dispensed by the auger.

I claim as my invention:

1. A dispensing device comprising a hopper adapted to receive a body of material to be dispensed and having an inlet adjacent the upper end thereof and an outlet adjacent the lower end, a dispensing device operable to dispense measured quantities of material through said outlet, a support disposed beneath and spaced below said inlet to support the material delivered to said hopper, an elongated paddle disposed in a horizontal plane, means supporting said paddle for movement through the space between said inlet and said support and for angular adjustment about the longitudinal axis of the paddle, and mechanism operable to move said paddle periodically through said space in synchronism with the operation of said dispensing device to transfer material from said support to said body, the quantity of material transferred depending upon the adjusted angular position of said paddle and substantially replacing the material dispensed by said device.

2. A dispensing device having, in combination, a receptacle adapted to receive material to be dispensed and having an inlet adjacent the upper end thereof and an outlet adjacent the lower end, a support disposed beneath and spaced below said inlet to support material delivered to said receptacle through the inlet, a member mounted to move horizontally through the space between said inlet and said support and operable to transfer from the support to the interior of said receptacle a quantity of material correlated with the effective vertical area of the member, a device operable to dispense measured quantities of material through said outlet, mechanism for moving said member periodically through said space in synchronism with the operation of said device, and means for adjusting the effective area of said member whereby material is transferred from said support to said receptacle at substantially the same rate as it is dispensed through said outlet.

3. A dispensing device having, in combination, a hopper adapted to hold a body of material to be dispensed and having an outlet opening adjacent the lower end thereof, an auger disposed within said hopper coaxially with said outlet and operable to turn and dispense measured quantities of material through said outlet, means defining an inlet disposed adjacent the upper end of said hopper and spaced laterally from the axis of said auger, a shelf disposed beneath and spaced from said inlet to support the material delivered through the inlet, a paddle projecting radially from said axis in the plane of the space between said shelf and said inlet and mounted to turn about said axis and pass through said space thereby to transfer a predetermined quantity of material from the shelf to said body, and mechanism operable to turn said auger and said paddle in synchronism with each other whereby the material is transferred from the shelf at substantially the same rate as the rate at which the auger dispenses the material.

4. A dispensing device having, in combination, a hopper having an inlet and an outlet at the upper and lower ends thereof respectively and adapted to receive a body of material to be dispensed, an auger disposed within said hopper and operable to dispense measured quantities of material through said outlet, a stationary shelf disposed below and spaced from said inlet to support the material delivered through the inlet, a horizontal paddle mounted to turn about a generally vertical axis disposed at one side of said shelf and move periodically through the space between said shelf and said inlet, said paddle being operable to transfer a predetermined quantity of material from said shelf to said body, and mechanism operable to turn said auger and move said paddle in synchronism with each other thereby to transfer material from said shelf to said body at substantially the same rate as the material is dispensed by said auger.

5. A dispensing device comprising a hopper adapted to hold a body of material to be dispensed and having an inlet and an outlet adjacent the upper and lower ends thereof respectively, a stationary shelf disposed beneath and spaced from said inlet to support the material delivered through the inlet, a paddle normally disposed at one side of said shelf and mounted to move periodically through the space between said inlet and said shelf thereby to transfer a predetermined quantity of material from the shelf to said body, mechanism operable to dispense measured quantities of material through said outlet, and mechanism operable to move said paddle and operate said mechanism in synchronism to cause the paddle to transfer material to said body at substantially the same rate as the material is dispensed through said outlet.

6. A dispensing device having, in combination, a hopper adapted to receive a body of material to be dispensed and having an outlet adjacent the lower end thereof and an inlet adjacent the upper end, an auger disposed within said hopper at said outlet and operable to dispense measured quantities of material, a support disposed beneath and spaced from said inlet at a point above the normal level of said body of material to support the material delivered to the inlet, a member mounted alongside said support to move periodically through the space between said inlet and said support and transfer a predetermined quantity of material from the support to said body, and means for moving said member periodically through said space in synchronism with the operation of said auger to cause said member to transfer material to said body at a rate approximating the rate the auger dispenses the material thereby to maintain a substantially constant head of material above the auger.

7. A dispensing device comprising a receptacle adapted to receive the material to be dispensed and having an inlet opening adjacent the upper end thereof and an outlet opening adjacent the lower end, mechanism operable to dispense measured quantities of material through said outlet opening, a support disposed below and spaced from said inlet opening to support the material delivered to said receptacle, a member supported for movement into and out of the space between said support and said inlet and operable as it moves through said space to remove a predetermined quantity of material from the support and transfer the same to the interior of said receptacle, and means operable to move said member periodically through said space in synchronism with the operation of said mechanism whereby the material is transferred from said support to said receptacle at substantially the same rate as the material is dispensed through said outlet.

References Cited in the file of this patent

UNITED STATES PATENTS

| | | |
|---|---|---|
| 1,488,074 | Soine et al. | Mar. 25, 1924 |
| 1,971,716 | Hitchcock | Aug. 28, 1934 |
| 2,102,993 | Claudel | Dec. 21, 1937 |